(12) United States Patent
Rubner

(10) Patent No.: US 11,215,162 B2
(45) Date of Patent: Jan. 4, 2022

(54) ROTOR BLADE, WIND TURBINE AND METHOD FOR INSTALLING AND PRODUCING A ROTOR BLADE

(71) Applicant: Wobben Properties GmbH, Aurich (DE)

(72) Inventor: Florian Rubner, Aurich (DE)

(73) Assignee: Wobben Properties GmbH, Aurich (DE)

(*) Notice: Subject to any disclaimer, the term of this patent is extended or adjusted under 35 U.S.C. 154(b) by 265 days.

(21) Appl. No.: 16/304,941

(22) PCT Filed: Jun. 9, 2017

(86) PCT No.: PCT/EP2017/064084
§ 371 (c)(1),
(2) Date: Nov. 27, 2018

(87) PCT Pub. No.: WO2017/212017
PCT Pub. Date: Dec. 14, 2017

(65) Prior Publication Data
US 2020/0378355 A1  Dec. 3, 2020

(30) Foreign Application Priority Data

Jun. 10, 2016 (DE) .................... 10 2016 110 747.6

(51) Int. Cl.
*F03D 1/06* (2006.01)
*F03D 13/10* (2016.01)
(52) U.S. Cl.
CPC ........... *F03D 1/0675* (2013.01); *F03D 13/10* (2016.05); *F05B 2230/61* (2013.01)

(58) Field of Classification Search
CPC .......... B66C 1/108; Y02P 70/50; Y02E 10/72; Y02B 10/30; F05B 2230/61; F03D 13/10; F03D 1/0675
See application file for complete search history.

(56) References Cited

U.S. PATENT DOCUMENTS 7,353,603 B2   4/2008  Wobben
8,043,067 B2  10/2011  Kuroiwa et al.
(Continued)

FOREIGN PATENT DOCUMENTS

DE   102011051574 A1    1/2012
DE   102011076937 B3   12/2012
(Continued)

*Primary Examiner* — Richard A Edgar
(74) *Attorney, Agent, or Firm* — Seed Intellectual Property Law Group LLP

(57) ABSTRACT

A rotor blade, a wind turbine and a method for installing and producing a rotor blade. In particular, a rotor blade for a wind turbine having a longitudinal direction, a transverse direction, a thickness, and a pressure side and a suction side opposite the pressure side, comprising a front pressure-side spar cap and/or a rear pressure-side spar cap, a front suction-side spar cap and/or a rear suction-side spar cap, a load introduction device, which is arranged between at least one of the pressure-side spar caps and at least one of the suction-side spar caps, wherein the load introduction device has a load coupling device, which is arranged and designed so as to receive a lifting device passed through a lifting opening, a lifting opening is arranged on the pressure side and/or the suction side, and the lifting opening is arranged between the front pressure-side spar cap and the rear pressure-side spar cap in the transverse direction and/or between the front suction-side spar cap and the rear suction-side spar cap in the transverse direction.

19 Claims, 6 Drawing Sheets

(56) References Cited

U.S. PATENT DOCUMENTS

| | | | |
|---|---|---|---|
| 8,562,302 B2 | 10/2013 | Bakhuis et al. | |
| 9,759,074 B2 | 9/2017 | Hoffmann | |
| 10,119,519 B2 | 11/2018 | Meyer et al. | |
| 2011/0142660 A1* | 6/2011 | Bakhuis | B60P 3/40 |
| | | | 416/223 R |
| 2013/0149154 A1* | 6/2013 | Kuroiwa | F03D 80/30 |
| | | | 416/146 R |
| 2013/0236324 A1* | 9/2013 | Bech | B66C 1/108 |
| | | | 416/233 |
| 2013/0309092 A1 | 11/2013 | Lenschow | |
| 2014/0127025 A1* | 5/2014 | Hoffmann | F01D 5/30 |
| | | | 416/219 R |
| 2014/0193255 A1 | 7/2014 | Hancock et al. | |
| 2015/0316028 A1 | 11/2015 | Brekenfeld | |

FOREIGN PATENT DOCUMENTS

| | | | | |
|---|---|---|---|---|
| JP | 2007-255366 A | | 10/2007 | |
| JP | 2013-545016 A | | 12/2013 | |
| JP | 2014-515458 A | | 6/2014 | |
| JP | 2014-528543 A | | 10/2014 | |
| JP | 2015078667 A | * | 4/2015 | ........... F03D 1/0675 |
| MD | 1127 Y | | 2/2017 | |
| RU | 105377 U1 | | 6/2011 | |
| WO | 2004070203 A2 | | 8/2004 | |
| WO | 2012163358 A1 | | 12/2012 | |
| WO | WO-2016101953 A1 | * | 6/2016 | ............. F03D 17/00 |

* cited by examiner

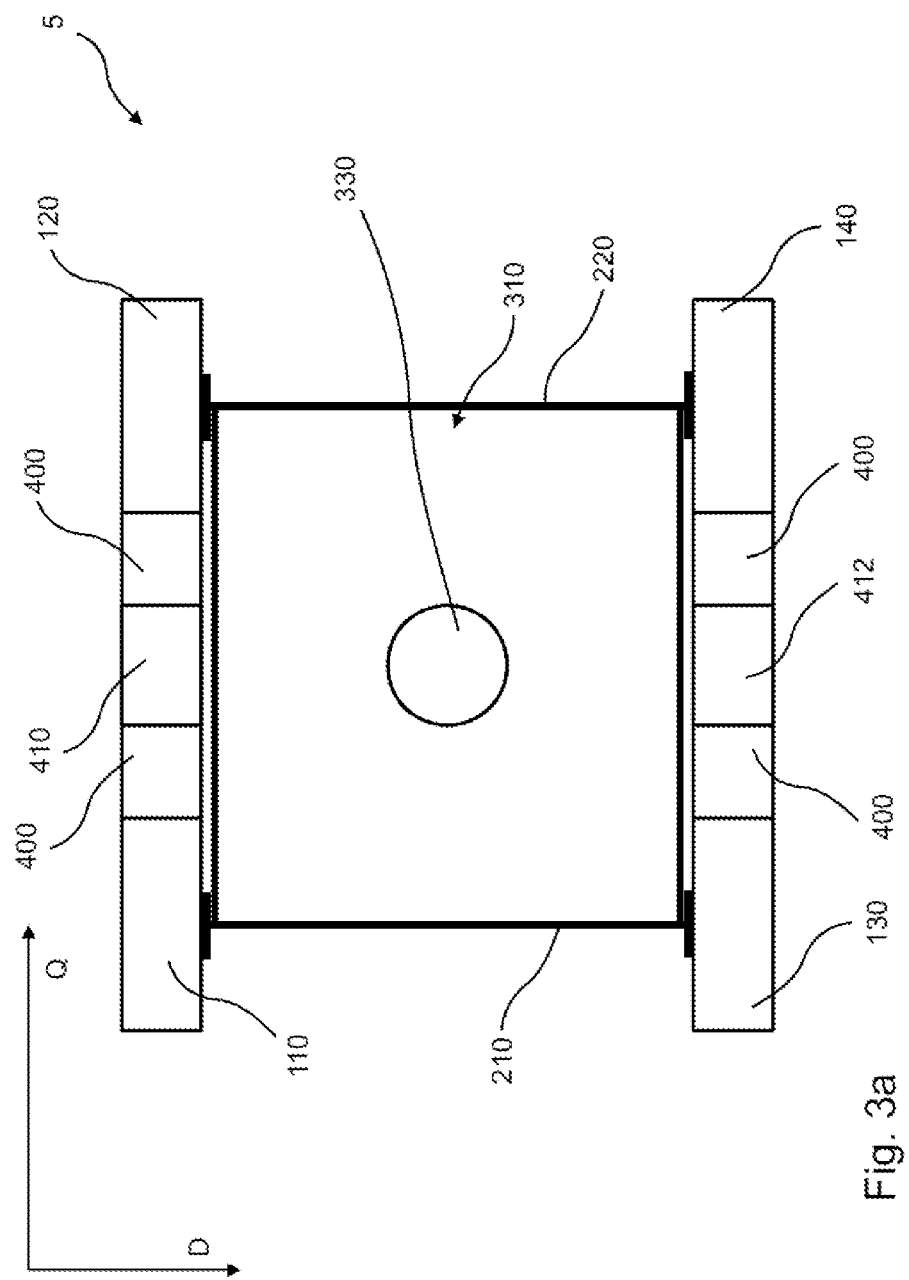

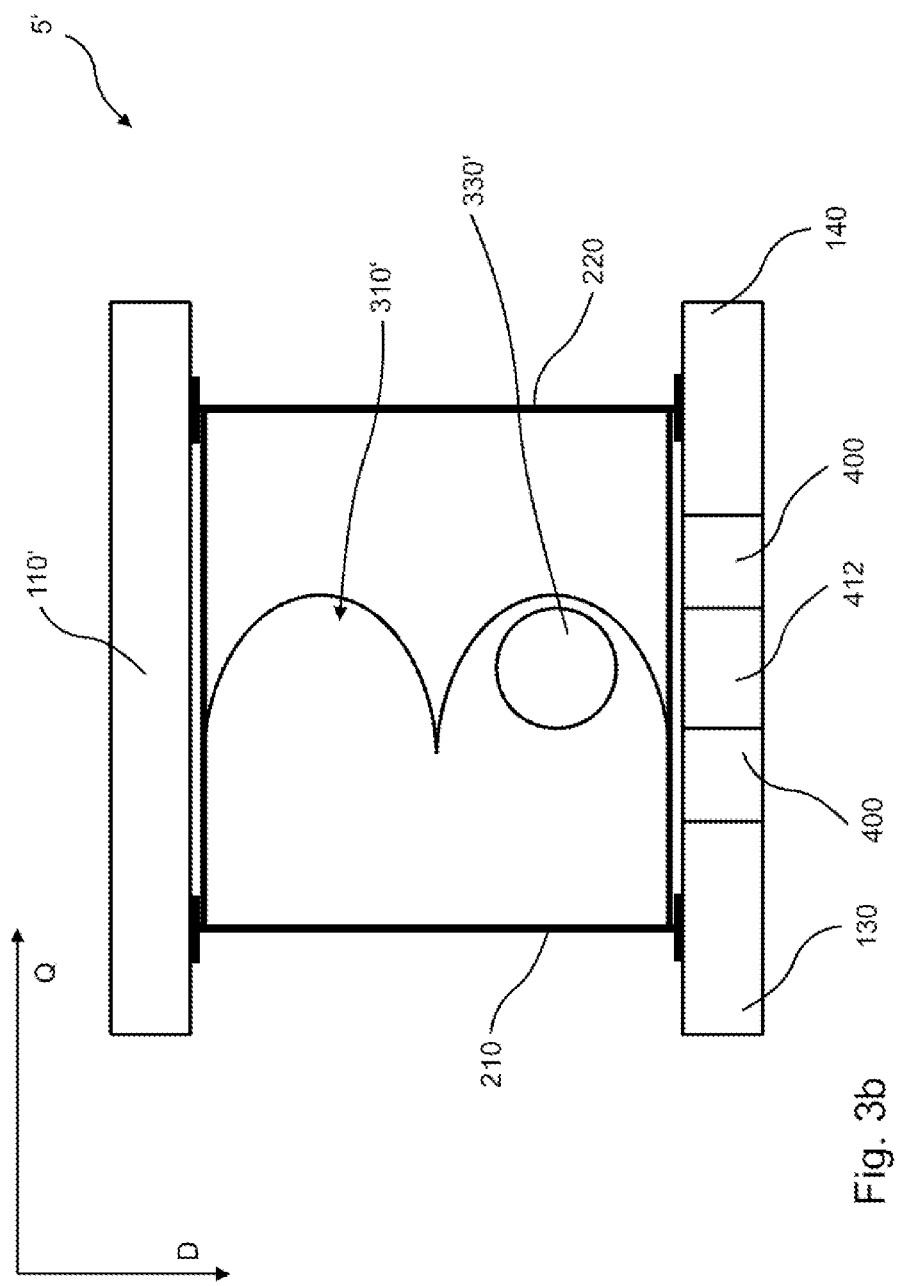

ROTOR BLADE, WIND TURBINE AND METHOD FOR INSTALLING AND PRODUCING A ROTOR BLADE

BACKGROUND

Technical Field

The invention relates to a rotor blade, a wind turbine and a method for installing and producing a rotor blade.

Description of the Related Art

A rotor blade of a wind turbine generally comprises an upper and a lower shell element. The outer surfaces of the shell elements substantially form the outer geometry of a rotor blade, wherein additional elements, e.g., a trailing edge segment and/or blade tip may be added. In general, the rotor blade comprises an upper shell element having a spar cap and/or a lower shell element having a spar cap. The spar cap or spar caps is/are preferably arranged on an inner side of the shell elements. The spar cap is preferably arranged on or against an inner surface of the shell element and/or embedded in the shell element. The spar caps are used, in particular, to reinforce the rotor blade in a longitudinal direction, being designed, in particular, to absorb forces along a longitudinal extent of the rotor blade. Spar caps are generally configured in such a way that they have a first and a second end. Furthermore, the spar cap generally has a sheet-like geometry, which is formed by a longitudinal extent and a transverse extent. Orthogonally to the transverse extent and orthogonally to the longitudinal extent, a spar cap preferably has a thickness.

Because of the increasing economic demands on wind turbines, among other reasons, there is a recognizable trend for wind turbines to become larger, e.g., in respect of hub height and/or rotor diameter. The rotor diameter is generally in a direct relationship with a longitudinal extent of the individual rotor blades, wherein the longitudinal extent, in turn, has effects on the weight of each individual rotor blade. Increasing dimensions and/or increasing weight of the rotor blades makes the handling of an individual rotor blade more difficult. This is especially relevant when installing a rotor blade, wherein a rotor blade is preferably guided precisely to a hub and/or a blade adapter of a wind turbine. Apart from this in any case difficult task of positioning a large and heavy rotor blade, additional boundary conditions that increase the difficulty may be present, e.g., unfavorable weather conditions.

Owing to the generally difficult positioning of a rotor blade during installation, there is not infrequently a need to reschedule installation dates. Thus, the construction of an individual installation and/or of an entire wind turbine farm is delayed, and this is generally also associated with higher costs. This can, in turn, reduce the profitability and/or reputation of the wind turbine manufacturer. Existing devices and methods offer various advantages but further improvements are desirable.

The German Patent and Trademark Office searched the following prior art in the priority application to the present application: DE 10 2011 076 937 B3.

BRIEF SUMMARY

Provided is a rotor blade, a wind turbine and a method for installing and producing a rotor blade which reduce or eliminate one or more of the disadvantages mentioned. Provided is a rotor blade, a wind turbine and a method for installing and producing a rotor blade which allow better positioning of a rotor blade during installation. Provided is a rotor blade, a wind turbine and a method for installing and producing a rotor blade which enable wind turbine construction to take place in a manner which is more independent of boundary conditions, e.g. weather conditions.

According to a first aspect of the present invention, provided is a rotor blade for a wind turbine having a longitudinal direction from a root region to a blade tip, a transverse direction from a leading edge to a trailing edge, a thickness orthogonally with respect to the longitudinal direction and orthogonally with respect to the transverse direction, and a pressure side and a suction side opposite the pressure side, comprising a front pressure-side spar cap and/or a rear pressure-side spar cap, a front suction-side spar cap and/or a rear suction-side spar cap, a load introduction device, which is arranged between at least one of the pressure-side spar caps and at least one of the suction-side spar caps, wherein the load introduction device has a load coupling device, which is arranged and designed so as to receive a lifting device passed through a lifting opening, the lifting opening is arranged on the pressure side and/or the suction side, and the lifting opening is arranged between the front pressure-side spar cap and the rear pressure-side spar cap in the transverse direction and/or between the front suction-side spar cap and the rear suction-side spar cap in the transverse direction.

The root region of a rotor blade is preferably the region of a rotor blade which faces the hub in an operating state of the wind turbine. As a further preference, the root region generally has a circular cross section orthogonally with respect to the longitudinal axis of the rotor blade and has a flange, which is arranged on the end of the rotor blade and by means of which the rotor blade is secured on a hub and/or a blade adapter.

The blade tip is arranged opposite the root region, and therefore the blade tip is arranged at an end of the rotor blade which faces away from a hub and/or a blade adapter of the wind turbine. The longitudinal extent of the rotor blade extends in the longitudinal direction between the end of the rotor blade in the root region and the end of the rotor blade at the blade tip.

Orthogonally with respect to the longitudinal extent of the rotor blade, the transverse extent extends in the transverse direction. In particular, the transverse extent of the rotor blade extends from a leading edge to a trailing edge. The region adjoining the leading edge of the rotor blade is also referred to as the nose region. The "spar structure" is preferably also arranged in this region of the rotor blade, wherein the spar structure preferably comprises one, two or more spar caps. The spar cap or caps and one, two or more spar webs preferably form a spar. This spar has a spar cross section orthogonally with respect to the longitudinal direction of the rotor blade and/or of the spar.

The invention is based on the insight that spar caps are usually arranged in a region which, in relation to the transverse direction, has a maximum extent in the thickness direction. By virtue of the arrangement of two spar caps on the pressure side and/or the suction side, these can be arranged in such a way in the direction of the leading edge and/or trailing edge that a lifting opening can be arranged in the region of a centroidal axis.

The spar caps can comprise and/or consist of various materials. In particular, it is preferred that the spar caps consist of or comprise a fiber composite material. Preferred materials for the fiber composite material are, in particular, glass fibers, e.g., high-modulus glass fibers or E-glass fibers, and/or carbon fibers and/or aramid fibers. Furthermore, the spar caps can also consist of or comprise more than one fiber composite material. An epoxy resin is preferably employed as a matrix.

The "rear casing" is preferably arranged in a region adjoining the trailing edge. The leading edge and the trailing edge are furthermore the regions of the rotor blade in which the upper and lower shell meet and are preferably joined together.

Orthogonally with respect to the longitudinal direction and orthogonally with respect to the transverse direction, the rotor blade extends in a thickness direction. The extent of the rotor blade in the thickness direction is the thickness. The extent in the longitudinal direction and in the transverse direction form two opposite sides of the rotor blade. In this context, one side is referred to as the pressure side and the other side is referred to as the suction side. The pressure side and the suction side each preferably have differently designed surfaces. The rotor blade is moved by virtue of the principle of aerodynamic lift. When wind impinges on a rotor blade, air is guided along both above and below the blade. The difference in the design of the pressure side and the suction side gives rise to the possibility that the air above the blade will have to travel further around the profile from the leading edge to the trailing edge and thus will have to flow more quickly than the air along the lower side. This gives rise to a reduced pressure above the blade, on the suction side, and an increased pressure below the blade, on the pressure side.

The spar caps, i.e., the front pressure-side spar cap and/or the rear pressure-side spar cap and/or the front suction-side spar cap and/or the rear suction-side spar cap extend substantially in the longitudinal direction of the rotor blade, in each case from a first end, which is preferably situated in a region adjoining or in the root region, to a second end, which is preferably arranged in a region which comprises the blade tip or adjoins the blade tip. It is therefore not absolutely essential that a spar cap should extend from a root region to a blade tip of a rotor blade. The front pressure-side spar cap and the front suction-side spar cap are preferably arranged in a region adjoining the leading edge of the rotor blade. The rear pressure-side spar cap and the rear suction-side spar cap are preferably arranged in a region which faces the trailing edge. If only the front pressure-side spar cap or the rear pressure-side spar cap is provided on the pressure side, this single pressure-side spar cap can preferably extend from a region adjoining the leading edge of the rotor blade to a region adjoining the trailing edge of the rotor blade. If only the front suction-side spar cap or the rear suction-side spar cap is provided on the suction side, this single suction-side spar cap can preferably extend from a region adjoining the leading edge of the rotor blade to a region adjoining the trailing edge of the rotor blade. In total, at least three spar caps should always be provided. In a variant embodiment with the minimum number of three spar caps, it is envisaged that either one front and one rear pressure-side spar cap and one suction-side spar cap or one front and one rear suction-side spar cap and one pressure-side spar cap are provided. In a variant embodiment with the front and the rear pressure-side spar cap and one suction-side spar cap, the lifting opening is preferably arranged between the front pressure-side spar cap and the rear pressure-side spar cap in the transverse direction. In a variant embodiment with the front and the rear suction-side spar cap and one pressure-side spar cap, the lifting opening is preferably arranged between the front suction-side spar cap and the rear suction-side spar cap in the transverse direction.

The front pressure-side spar cap and/or the rear pressure-side spar cap are arranged in a region of the rotor blade which faces the pressure side of the rotor blade. The front suction-side spar cap and the rear suction-side spar cap are preferably arranged in a region of the rotor blade which faces the suction side.

Contrary to the generally envisaged arrangement of two spar caps in the rotor blade, wherein preferably one spar cap is arranged on the pressure side and one spar cap is arranged on the suction side, at least three spar caps are provided. Providing three spar caps, in particular two spar caps in the region of the pressure side and one spar cap in the region of the suction side or of two spar caps in the region of the suction side and one spar cap in the region of the pressure side or, alternatively, two or more spar caps in the region of the pressure side and/or in the region of the suction side, makes it possible for the spar caps at least on one side, i.e., on the pressure side and/or the suction side, to be spaced apart from each other in each case. This spacing is provided, in particular, in the direction of the transverse direction in order to arrange the lifting opening between two spar caps arranged on one side.

The rotor blade comprises the load introduction device, which is arranged between at least one of the pressure-side spar caps and at least one of the suction-side spar caps. The load introduction device has an extent in the thickness direction, wherein the load introduction device is arranged at least with one or more regions between a pressure-side spar cap and a suction-side spar cap. The extent of the load introduction device in the thickness direction is preferably less than the spacing in the thickness direction of the front pressure-side spar cap from the front suction-side spar cap and/or than the spacing in the thickness direction of the rear pressure-side spar cap from the rear suction-side spar cap. As a further preference, the extent of the load introduction device in the thickness direction is less than the spacing in the thickness direction of the one pressure-side spar cap from the front and/or the rear suction-side spar cap and/or than the spacing in the thickness direction of the one suction-side spar cap from the front of and/or rear pressure-side spar cap. The load introduction device is preferably designed as a load introduction rib.

As a further preference, the load introduction device is arranged within the spar and/or within the spar cross section. The arrangement of the load introduction device in the spar can involve either the entire load introduction device or just a part thereof.

Furthermore, the load introduction device has the load coupling device. The load coupling device enables a force and/or a moment to be introduced into the load introduction device. The load coupling device of the load introduction device is arranged and designed to receive a lifting device. The lifting device, which is not part of the claimed subject matter, can be a chain or a cable, for example.

The load introduction device preferably comprises a plastic or consists of a plastic. Moreover, the load introduction device can consist of or comprise a fiber composite material. The fiber composite material preferably comprises organic fibers and/or inorganic fibers, wherein, in particular, glass fibers and/or carbon fibers and/or aramid fibers are preferred. Furthermore, the load introduction device can also consist of or comprise a metallic material, preferably a steel or a steel alloy and/or an aluminum or an aluminum alloy. Moreover, it is preferred that the load introduction device consists of or comprises wood and/or ceramics and/or other engineering materials.

Furthermore, the rotor blade has the lifting opening on the pressure and/or suction side. The lifting opening can be arranged between the front pressure-side spar cap and the rear pressure-side spar cap and/or between the front suction-side spar cap and the rear suction-side spar cap. The lifting opening is preferably arranged in such a way that it preferably does not pass through one of the spar caps, even partially. In particular, the introduction of the lifting opening preferably does not lead to notch effects on one of the spar caps. Since the lifting opening preferably has a direction of passage which is parallel to the thickness direction, the lifting opening can allow access from the outside of the rotor blade to the load introduction device if the lifting opening has the same position as or a similar position to the load introduction device in relation to the longitudinal direction.

As a further preference, the lifting opening has a direction of passage which has a direction component in the thickness direction and a direction component in the longitudinal direction. It is possible to pass a lifting device passed through the lifting opening to the load introduction device and thus to arrange the lifting device on the load coupling device and preferably to connect it to the latter. In an advantageous embodiment of the lifting opening, said opening preferably has a cross section which is substantially round orthogonally with respect to the direction of passage. As a further preference, the lifting opening has an oval and/or slot-shaped and/or triangular and/or rectangular and/or polygonal cross section. Moreover, the cross section can also have other advantageous configurations, e.g., a tooth-shaped profile on an inner circumferential surface of the lifting opening.

The invention is based, inter alia, on the insight that the spar caps on existing rotor blades are generally arranged along a centroidal axis in the longitudinal direction of the rotor blade. It is therefore generally impossible to achieve fastening of a lifting device in the region of the centroidal axis in the case of conventional rotor blades since this would presuppose at least one opening in a spar cap. However, an opening on or in the spar cap would lead to increased stresses because of notch effects, which could reduce the strength of the spar cap. The spar cap is an integral strengthening element of the rotor blade and should preferably not be subjected to such notch effects. In general, therefore, a lifting opening is arranged in a region in which no spar cap is arranged in the case of existing rotor blades. Since the spar caps of existing rotor blades generally extend along the centroidal axis, however, one, two or more lifting openings are preferably arranged outside the centroidal axis in the case of existing solutions, e.g., in a region adjoining the leading edge and/or in a region adjoining the trailing edge of the rotor blade.

Owing to the position of the center of gravity or of the centroidal axis in the longitudinal direction of the rotor blade, the lifting openings and/or associated load introduction devices on existing rotor blades can be arranged at a distance from the centroidal axis or the center of gravity but not on the centroidal axis or at the center of gravity of the rotor blade. Owing to the distance between the lifting opening and/or the load introduction device and the centroidal axis or center of gravity of the rotor blade, a moment arises when the rotor blade is lifted with a lifting device passed to the load introduction device through the lifting opening. This moment can be explained, in particular, by the distance between the centroidal axis and a point of action of a force. Owing to this moment, the rotor blade can rotate into unwanted positions when it is being raised by a lifting device. Moreover, a lower positioning accuracy can be observed in positioning during installation of the rotor blade. Owing to the rotation about a longitudinal axis, the area of action of the wind can increase and this, in turn, can lead to lower permitted construction wind speeds. Moreover, stability during installation may be reduced.

By means of the rotor blade according to the invention, the load introduction device and/or the lifting opening can now be arranged on the centroidal axis of the rotor blade, and the abovementioned moment during the lifting of the rotor blade can be reduced or eliminated, improving stability and/or safety during transportation and/or installation and/or simplifying or improving transportation and/or installation. In contrast to an arrangement of the lifting opening in or on a spar cap and the associated weakening of the spar cap, improved strength of the spar caps can be achieved. By virtue of this improved strength of the spar caps, it is possible, on the one hand, to save material for the spar caps and/or to employ a smaller volume of material, thus reducing the weight of the spar cap or spar caps.

In a preferred variant embodiment of the rotor blade, said rotor blade comprises a front spar web and/or a rear spar web, which preferably extends/extend with the main direction of extent or main directions of extent thereof in the longitudinal direction, wherein the load introduction device is arranged on the front spar web and/or the rear spar web. The spar webs preferably likewise have a sheet-like extent, wherein the sheet-like extent of the spar webs is preferably orthogonal with respect to the sheet-like extent of the spar caps. The spar is preferably formed by the at least three spar caps and a front and a rear spar web. In respect of a circumferential surface, this spar can also be regarded as discontinuous since, when two spar caps are provided in a region adjoining the pressure side, in particular the front pressure-side spar cap and the rear pressure-side spar cap, these are spaced apart, and/or because, when two spar caps are provided in a region adjoining the suction side, the front suction-side spar cap and the rear suction-side spar cap, in particular, are spaced apart. The spar caps preferably ensure a strength of the rotor blade in the longitudinal direction, and the spar webs preferably ensure a strength against bending and/or torsion. The interspace between the spar caps on the pressure side and/or the suction side can preferably be closed with a material.

According to another preferred variant embodiment of the rotor blade, it is envisaged that the front pressure-side spar cap and/or the front suction-side spar cap is/are secured on the front spar web. Here, the front spar web preferably faces the leading edge of the rotor blade. In another, particularly preferred, variant embodiment, it is envisaged that the rear pressure-side spar cap and/or the rear suction-side spar cap is/are secured on the rear spar web. Here, the rear spar web preferably faces the trailing edge of the rotor blade.

In another, particularly preferred, variant embodiment of the rotor blade, it is envisaged that a first transverse spacing between the front pressure-side spar cap and the rear pressure-side spar cap and/or a second transverse spacing between the front suction-side spar cap and the rear suction-side spar cap has or have a larger and/or the same dimension in the transverse direction than or as the dimension of the lifting opening in the transverse direction. This dimensioning of the lifting opening ensures, in particular, that preferably little or no material removal from a spar cap or from two or more or all the spar caps is caused by the introduction and/or provision of the lifting opening. This is particularly preferred since the spar caps may be weakened by removal of material and/or by a notch effect caused thereby.

According to a preferred variant embodiment of the rotor blade, it is envisaged that the load introduction device is arranged between the front spar web and the rear spar web in the transverse direction. In this variant embodiment, the load introduction device is preferably arranged within a spar cap. This spar is formed by the at least three spar caps described above and the front and rear spar web. Here, apart from possibly being secured on the spar caps, the load introduction device can additionally be secured on the front and/or the rear spar web. Thus, a high strength of the connection between the load introduction device and the other elements of the rotor blade can be achieved.

According to another preferred variant embodiment of the rotor blade, it is envisaged that a centroidal axis of the rotor blade oriented substantially parallel to the longitudinal direction extends through the load introduction device. The centroidal axis is a straight line which passes through the center of gravity of the rotor blade and extends substantially parallel to the longitudinal direction. By virtue of the fact that the centroidal axis extends through the load introduction device and furthermore preferably through the load coupling device, lifting at the centroidal axis can be made possible when the rotor blade is lifted with a lifting device, ensuring that no moment or a reduced or low moment is introduced into the rotor blade during lifting.

According to another preferred variant embodiment of the rotor blade, it is envisaged that the load coupling device is designed as a load introduction opening, which is arranged substantially orthogonally to the thickness, preferably substantially in the longitudinal direction. The load introduction opening is preferably designed as a through opening, which extends through the entire load introduction device. As an alternative preference, the load introduction opening in the load introduction device is designed as a blind hole. The load introduction opening is preferably configured in such a way that a bolt can be introduced into said opening. In particular, the center line of the load introduction opening extends orthogonally with respect to the thickness. Thus, the load introduction opening can furthermore also extend substantially in the direction of the longitudinal extent. It can furthermore be advantageous for the load introduction opening of the load introduction device to be arranged parallel to the thickness.

In another preferred variant embodiment of the rotor blade, it is envisaged that the centroidal axis passes through the lifting opening and/or through the load coupling device. In particular, this means that the centroidal axis extends through part of the lifting opening and/or through part of the load coupling device. As a particular preference, the centroidal axis of the load coupling device, in particular of the load introduction opening, is arranged coaxially with the centroidal axis of the rotor blade.

According to another, particularly preferred, variant embodiment of the rotor blade, it is envisaged that an interspace between the front pressure-side spar cap and/or the rear pressure-side spar cap and/or the front pressure-side spar cap and/or the rear suction-side spar cap is filled at least partially with a first material, preferably a balsa wood and/or a foam, which has a lower density and/or strength or stiffness than the material of the pressure-side spar caps and/or the suction-side spar caps. The first material preferably comprises polyethylene terephthalate, also referred to as PET, and/or polyvinyl chloride, also referred to as PVC, or consists of this or these. For a region of the interspace adjoining the lifting opening, provision is preferably made for this region to comprise a material or to consist of a material which comprises a multiaxial non-crimp fabric. The first material is used, in particular to fill the first transverse spacing and/or the second transverse spacing. The lifting opening can be arranged in this material.

According to another, particularly preferred, variant embodiment of the rotor blade, this comprises two or more load introduction devices, and/or two or more lifting openings, wherein the two or more load introduction devices and/or the two or more lifting openings are arranged in accordance with at least one of the variant embodiments described above. One, two or more further load introduction ribs are preferably arranged in a region adjoining the leading edge and/or in a region adjoining the trailing edge.

In particular, the variant embodiment with two lifting openings and two load introduction devices is preferred. A first load introduction device and a corresponding first lifting opening are preferably arranged in a region which lies between the center of gravity of the rotor blade and the root region. As a further preference, a second load introduction device and a corresponding second lifting opening are arranged in a region which lies between the center of gravity and the blade tip. As a particular preference, the abovementioned load introduction devices and/or lifting openings each have the same spacing from the center of gravity of the rotor blade. In this preferred variant embodiment, there is the possibility of passing a lifting device through the lifting openings and connecting it to the load introduction devices by a load coupling device and thus lifting the rotor blade in a horizontal position. From this position, the rotor blade can be positioned as desired by appropriate handling of the lifting devices.

According to another, particularly preferred, variant embodiment of the rotor blade, said rotor blade comprises two or more load coupling devices, which are preferably arranged and designed as load introduction openings in order to receive cylindrical coupling elements of one or more lifting devices. In this variant embodiment, the cylindrical coupling elements, which are designed as steel cylinders, for example, are preferably passed into the load introduction openings. When using a lifting device which has a loop at one end, for example, and this loop has a larger inside diameter than the outside diameter of the abovementioned cylindrical coupling elements, a preferred connection of the lifting device to the load introduction device and/or the coupling elements can be implemented.

According to another particularly preferred variant embodiment of the rotor blade, it is envisaged that the load introduction device is designed as a connection element for a rotor blade deicing system. The rotor blade deicing system can comprise, in particular, heating elements, e.g., heating tubes, which can be arranged and/or secured, in particular, on the load introduction device.

According to another aspect of the present invention, provided is a wind turbine having at least one rotor blade according to at least one of the variant embodiments described above. A wind turbine of this kind is characterized, in particular, in that the installation of the wind turbine takes up less time and less personnel and hence that it can be erected at reduced cost. Moreover, a wind turbine of this kind can also be set up in weather conditions in which that is no longer possible in the prior art or in which a wind turbine can only be constructed under difficult conditions.

According to another aspect of the present invention, provided is a method for installing a rotor blade comprising the steps of providing a rotor blade, in particular a rotor blade according to at least one of the variant embodiments described above, passing a lifting device through the lifting opening, securing the lifting device on the load introduction device, preferably by arranging a lifting element in the load introduction opening and securing the lifting device on the lifting element, raising the rotor blade into an installation position by means of the lifting device.

According to another aspect of the present invention, provided is a method for producing a rotor blade comprising the steps of connecting a first spar web to at least one load introduction device, connecting a second spar web to the at least one load introduction device, arranging a subassembly comprising the first spar web, the second spar web and the at least one load introduction device on a rotor blade element, in particular an outer shell, of the rotor blade. The installation of this subassembly makes it possible to simplify the alignment of the spar webs. Here, the load introduction device also serves as a setting and/or positioning aid, particularly for one or more spar webs. It is thus possible to save time and/or costs in the production of the rotor blade.

The methods according to the invention have features and method steps which are suitable particularly for use for a rotor blade according to the invention and for the developments thereof. For further advantages, variant embodiments and embodiment details of these further aspects and the possible development thereof, attention is also drawn to the above description of the corresponding features and developments of the rotor blade.

BRIEF DESCRIPTION OF THE SEVERAL VIEWS OF THE DRAWINGS

Preferred embodiments of the invention are explained by way of example with reference to the attached figures. In the drawing:

FIG. 3a shows a schematic sectioned view of an illustrative embodiment of a spar;

FIG. 3b shows a schematic sectioned view of another illustrative embodiment of a spar;

DETAILED DESCRIPTION

In the figures, identical or substantially functionally identical or -similar elements are denoted by the same reference signs.

Figure 1:
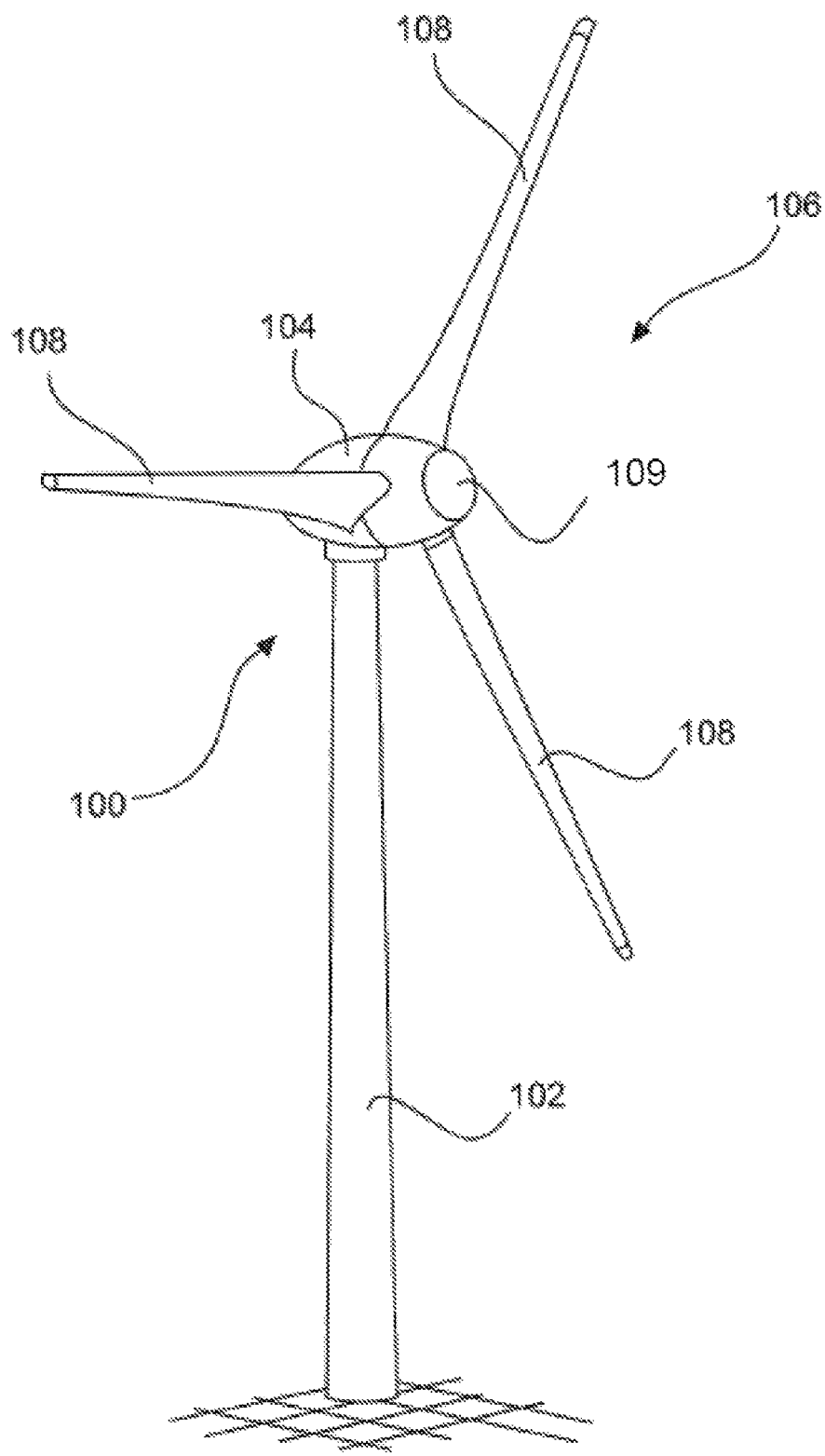
FIG. 1 shows a schematic view of an illustrative embodiment of a wind turbine.

FIG. 1 shows a schematic view of an illustrative embodiment of a wind turbine. In particular, FIG. 1 shows a wind turbine 100 having a tower 102 and a nacelle 104. A rotor 106 with three rotor blades 108 and a spinner 109 is arranged on the nacelle 104. In operation, a rotary motion is imparted to the rotor 106 by the wind, thereby driving a generator in the nacelle 104.

Figure 2:
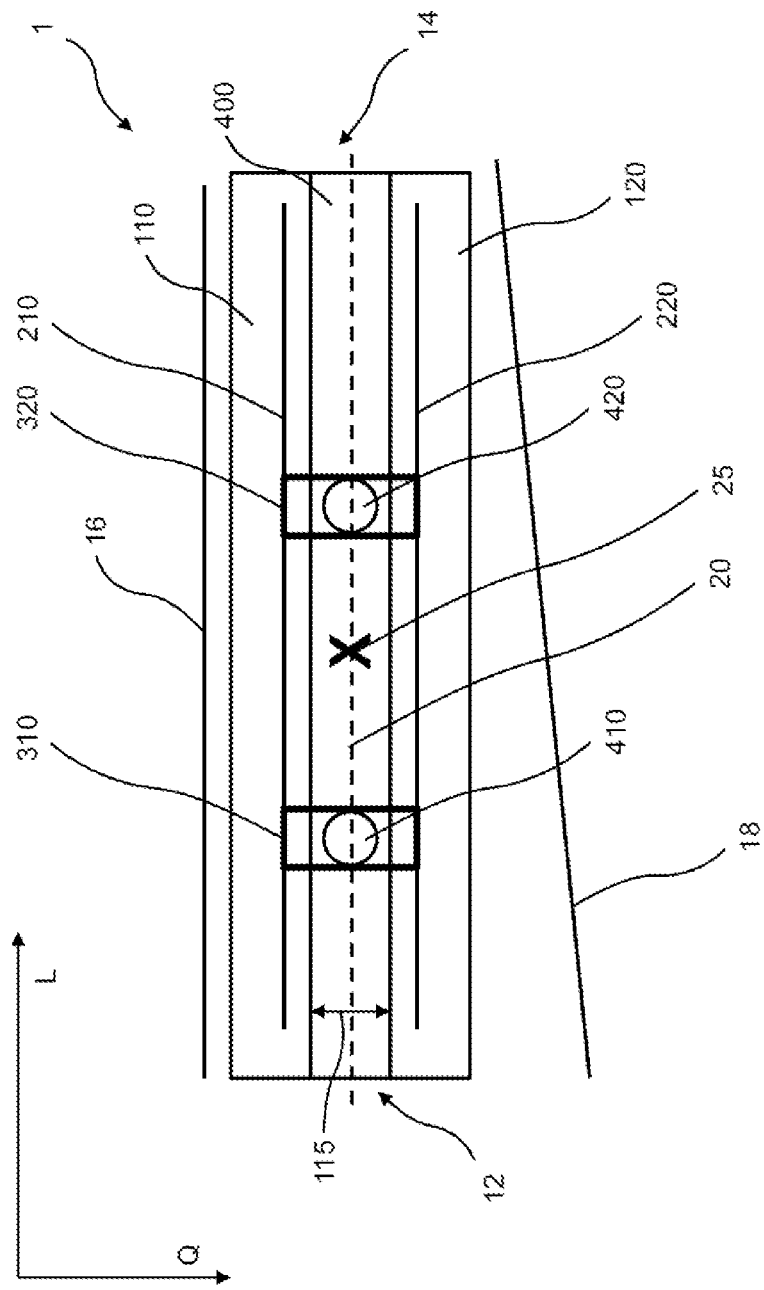
FIG. 2 shows a schematic, longitudinally sectioned view of a detail of an illustrative embodiment of a rotor blade.

FIG. 2 shows a schematic, longitudinally sectioned view of a detail of an illustrative embodiment of a rotor blade. The illustrated detail of the rotor blade 1 extends in longitudinal direction L from an end 12 facing the rotor blade root to an end 14 facing the rotor blade tip. In a transverse direction Q, the rotor blade 1 extends from a leading edge 16 to a trailing edge 18. Furthermore, the rotor blade 1 has a front pressure-side spar cap 110 and a rear pressure-side spar cap 120. The front pressure-side spar cap 110 faces the leading edge 16, and the rear pressure-side spar cap 120 faces the trailing edge 18. There is a first transverse spacing 115 between the front pressure-side spar cap 110 and the rear pressure-side spar cap 120, wherein the transverse spacing 115 extends in the transverse direction Q. A core material 400 is arranged between the front pressure-side spar cap 110 and the rear pressure-side spar cap 120 within a region of the first transverse spacing 115. The pressure-side spar caps 110, 120 and a center line of the core material 400 extend substantially parallel to the leading edge 16 in a main direction of extent. A front spar web 210 and a rear spar web 220 likewise each extend parallel to the leading edge 16 with their main direction of extent.

A first load introduction device 310 and a second load introduction device 320 are arranged on the front pressure-side spar cap 110 and on the rear pressure-side spar cap 120. The first load introduction device 310 and the second load introduction device 320 are furthermore arranged between the front spar web 210 and the rear spar web 220, wherein securing the load introduction device 310, 320 on the spar webs 210, 220 is preferred. A first lifting opening 410 is arranged centrally with respect to the first load introduction device 310 in relation to the longitudinal direction L and the transverse direction Q. The direction of passage of the lifting opening 410 extends in a thickness direction, which is oriented orthogonally with respect to the longitudinal direction L and orthogonally with respect to the transverse direction Q. Orthogonally with respect to the direction of passage, the lifting opening 410 has a substantially round cross section. Similarly to the first load introduction device 310, the second load introduction device 320 has a second lifting opening 420, which has substantially the same properties as the first lifting opening 410. Furthermore, a centroidal axis 20 of the rotor blade 1 extends in the longitudinal direction L. In particular, the centroidal axis 20 extends through the center of gravity 25 of the rotor blade. In the longitudinal direction, the first load introduction device 310 and the second load introduction device 320 as well as the corresponding lifting openings 410, 420 have a spacing from the center of gravity 25. In the transverse direction Q, centers of the first load introduction device 310 and of the second load introduction device 320 as well as of the corresponding lifting openings 410, 420 have substantially no spacing from the center of gravity 25.

FIG. 3a shows a schematic sectioned view of an illustrative embodiment of a spar. The spar 5 has a front pressure-side spar cap 110, a rear pressure-side spar cap 120, a front suction-side spar cap 130 and a rear suction-side spar cap 140. The front spar web 210 is arranged between the front pressure-side spar cap 110 and the front suction-side spar cap 130. The front spar caps 110, 130 are preferably connected to the front spar web 210. The rear spar web 220 is arranged between the rear pressure-side spar cap 120 and the rear suction-side spar cap 140. The first load introduction device 310 is furthermore arranged between the front spar web 210 and the rear spar web 220 as well as between the four spar caps 110, 120, 130, 140, said first load introduction device having, in each case approximately in the center in relation to the transverse direction and the thickness direction, a first load introduction opening 330. The core material 400 is arranged between the pressure-side spar caps 110, 120. This sectioned view illustrates the fact that the first lifting opening 410 is arranged in the core material 400 in the region of the load introduction device 310. The first lifting opening 410 is situated between the front and the rear pressure-side spar cap 110, 120. A core material 400, which, in the present case, has a third lifting opening 412 in the region shown, is likewise arranged between the front suction-side spar cap and the rear suction-side spar cap.

FIG. 3b shows another variant of a spar 5' having a load introduction device 310', which is arranged between a front and a rear spar web 210, 220. In contrast to the spar 5 described above, spar 5' is distinguished, in particular, by the B-shaped cross section of the load introduction device 310' and furthermore by the fact that only a single pressure-side spar cap 110' is arranged on that side of the spar 5' which faces the pressure side. This pressure-side spar cap 110' has the same extent in the transverse direction as the sum of the extents in the transverse direction of the front and the rear suction-side spar cap 130, 140 and of the core material 400, which is arranged between the front and the rear suction-side spar cap 130, 140 in the transverse direction.

Figure 4:
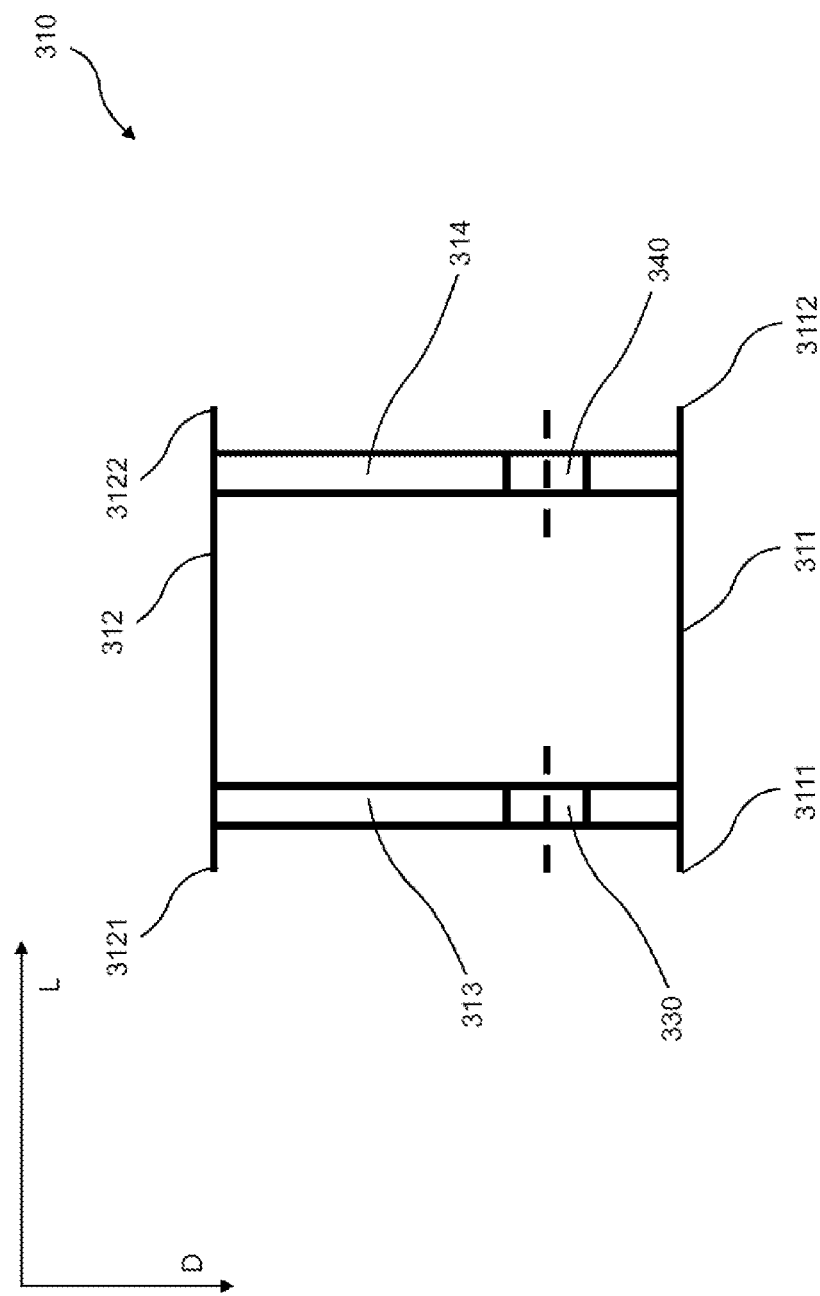
FIG. 4 shows a sectioned schematic view of an illustrative embodiment of a load introduction device.

FIG. 4 shows a sectioned schematic view of an illustrative embodiment of a load introduction device. The first load introduction device 310 extends in the thickness direction D from a head plate 312 to a foot plate 311. The head plate 312 extends in the longitudinal direction L from a first edge 3121 to a second edge 3122. The foot plate extends from a first edge 3111 to a second edge 3112. The first side wall 313 and the second side wall 314 extend in the thickness direction D between the head plate 312 and the foot plate 311. The first side wall 313 is arranged on the head plate in a region adjoining the first edge 3121 and on the foot plate in a region adjoining the first edge 3111. The second side wall 314 is arranged on the head plate 312 in a region adjoining the second edge 3122, on the opposite side of the first load introduction device 310 in the longitudinal direction L. The second side wall 314 is arranged on the foot plate 311 in a region adjoining the second edge 3112. Arranged in the first side wall 313 is a first load introduction opening 330, the direction of passage of which is oriented substantially parallel to the longitudinal direction L. A second load introduction opening 340 is arranged in the second side wall 314 coaxially with the first load introduction opening 330.

Figure 5:
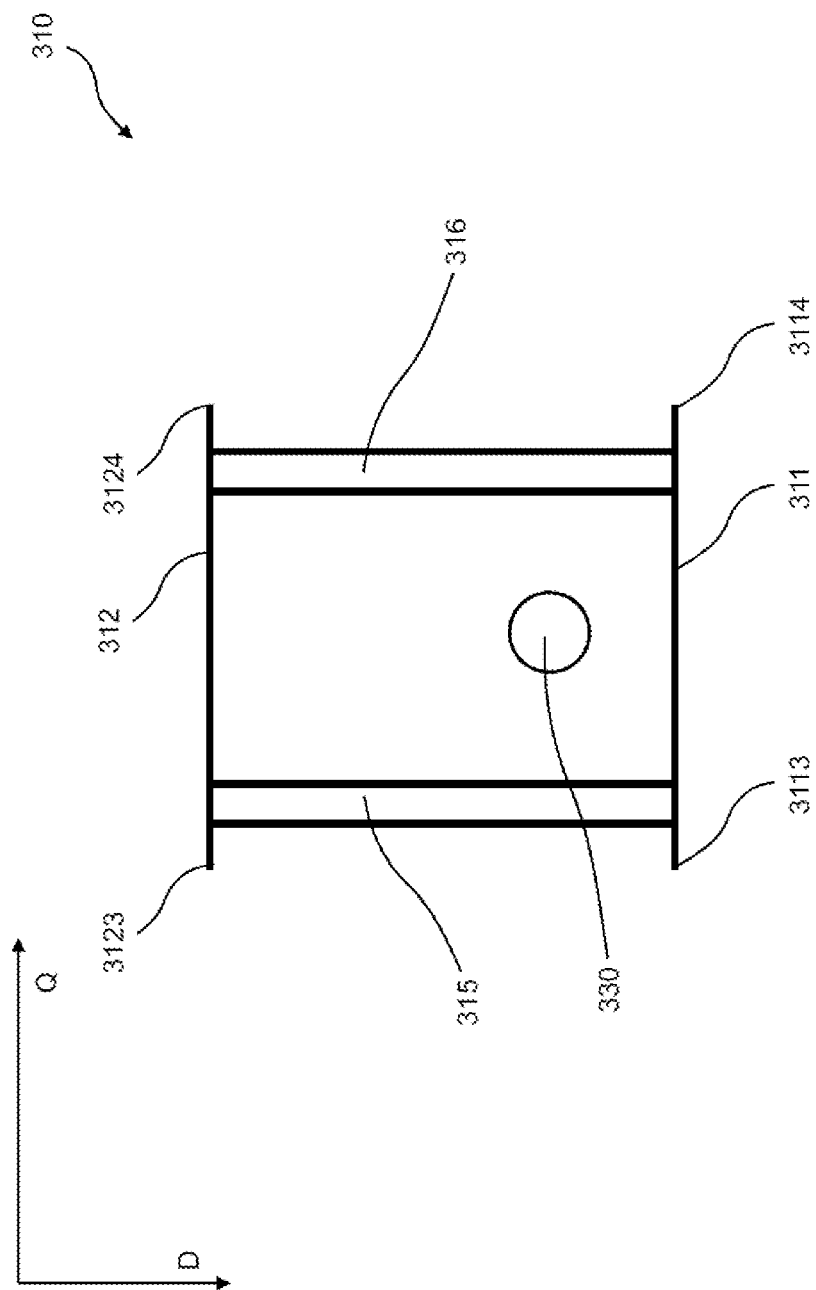
FIG. 5 shows another schematic sectioned view of the load introduction device shown in FIG. 4.

FIG. 5 shows another schematic sectioned view of the load introduction device shown in FIG. 4. The first load introduction device 310 has a third side wall 315 in the region of two mutually opposite further edges 3123, 3113 of the head plate 312 and of the foot plate 311. A fourth side wall 316 is arranged at two opposite edges 3124, 3114 on the opposite side of the head plate 312 and of the foot plate 311. In this illustration, the first load introduction opening 330, which has already been shown in FIG. 4, is shown in a plan view.

Another illustrative load introduction device can also be secured only on one of the spar webs and extend in the direction of the second spar web. For example, the load introduction device can be of "B"-shaped design in one view. However, in such a configuration of the load introduction device too, a load coupling device is preferably arranged at the center of gravity and/or on a centroidal axis of the rotor blade.

The rotor blade 1 shown can be secured in an advantageous manner on a hub and/or a blade adapter of a wind turbine 100. Through the arrangement of, preferably four, spar caps, two spar caps on the pressure side and two on the suction side, spaced apart in the transverse direction, there is the possibility of passing a lifting device through the lifting opening 410, 412, 420 to the load introduction device 310, 320 and providing a point of engagement of a force of a lifting device in the region of a centroidal axis of the rotor blade. This can likewise be achieved if a total of three spar caps is arranged, wherein a single spar cap is arranged either on the pressure side or the suction side, and the lifting device can be passed to the load introduction device 310, 310', 320 only from the side on which two spar caps with a corresponding spacing are arranged.

The rotor blade can thus be raised and moved into an installation position in an improved way. This is performed, for example, by passing a lifting device with a loop at one end through one of the lifting openings 410, 412, 420 and guiding it into a region between the first side wall 313 and the second side wall 314 and between the third side wall 315 and the fourth side wall 316 of the load introduction device 310 and, in particular, guiding a central point of the loop coaxially with the first and the second load introduction opening 330, 340, and then passing a coupling element, e.g., a steel bolt first of all through the first load introduction opening 330, then through the loop of the lifting device and, after this, through the second load introduction opening 340. Thus, a lifting device is secured on the load introduction device 310, enabling a force to be exerted on the latter. Since the load introduction device 310 is preferably secured on one or both spar webs 210, 220 and/or on one, two or more of the spar caps 110, 120, 130, 140, the rotor blade can thus be raised by means of the lifting device.

REFERENCE SIGNS 1 rotor blade
5, 5' spar
12 end facing the rotor blade root
14 end facing the rotor blade tip
16 leading edge
18 trailing edge
20 rotor blade centroidal axis
25 rotor blade center of gravity
100 wind turbine
102 tower
104 nacelle
106 rotor
108 rotor blades
109 spinner
110, 110' front pressure-side spar cap
115 first transverse spacing
120 rear pressure-side spar cap
130 front suction-side spar cap
140 rear suction-side spar cap
210 front spar web
220 rear spar web
310, 310' first load introduction device
311 foot plate
312 head plate
313 first side wall
314 second side wall
315 third side wall
316 fourth side wall
320 second load introduction device
330, 330' first load introduction opening
340 second load introduction opening
400 core material
410 first lifting opening
412 third lifting opening
420 second lifting opening
3111 first edge of foot plate
3112 second edge of foot plate
3113 third edge of foot plate
3114 fourth edge of foot plate
3121 first edge of head plate
3122 second edge of head plate 3123 third edge of head plate
3124 fourth edge of head plate
D thickness
L longitudinal direction
Q transverse direction

The invention claimed is:

1. A rotor blade for a wind turbine comprising:
a root region and a blade tip, a longitudinal direction extending from the root region to the blade tip;
a leading edge and a trailing edge, a transverse direction extending from the leading edge to the trailing edge, a thickness that is orthogonal with respect to the longitudinal direction and orthogonally with respect to the transverse direction;
a pressure side and a suction side opposite the pressure side;
a front pressure-side spar cap and a rear pressure-side spar cap;
a front suction-side spar cap and a rear suction-side spar cap; and
first and second load introduction devices arranged between at least one of the front or rear pressure-side spar caps and at least one of the front or rear suction-side spar caps,
wherein each of the first and second load introduction devices has a load coupling device comprising lifting openings, respectively, wherein the lifting openings are arranged about a center of gravity of the rotor blade and configured to receive a lifting device,
wherein one or more of the lifting openings are arranged on at least one of: the pressure side or the suction side, and
wherein one or more of the lifting openings are arranged between one of:
the front pressure-side spar cap and the rear pressure-side spar cap in the transverse direction, or
the front suction-side spar cap and the rear suction-side spar cap in the transverse direction.

2. The rotor blade as claimed in claim 1, comprising a front spar web and a rear spar web, wherein the first and second load introduction devices are arranged on one of the front spar web or the rear spar web.

3. The rotor blade as claimed in claim 1, comprising:
a first transverse spacing between the front pressure-side spar cap and the rear pressure-side spar cap, or
a second transverse spacing between the front suction-side spar cap and the rear suction-side spar cap,
wherein at least one of the first and second transverse spacings is equal to or greater than a dimension of the lifting openings in the transverse direction.

4. The rotor blade as claimed in claim 2, wherein at least one of the first and second load introduction devices is arranged between the front spar web and the rear spar web in the transverse direction.

5. The rotor blade as claimed in claim 1 wherein a centroidal axis of the rotor blade is oriented substantially parallel to the longitudinal direction and extends through the first and second load introduction devices.

6. The rotor blade as claimed in claim 1, wherein the lifting openings of the load coupling devices are arranged substantially orthogonally to the thickness.

7. The rotor blade as claimed in claim 5, wherein the centroidal axis passes through one of the lifting openings of one of the load coupling devices.

8. The rotor blade as claimed in claim 1, wherein an interspace between the front pressure-side spar cap, the rear pressure-side spar cap, the front suction-side spar cap, and the rear suction-side spar cap is filled at least partially with a first material.

9. The rotor blade as claimed in claim 1, wherein each load coupling device comprises a plurality of lifting openings.

10. The rotor blade as claimed in claim 1, wherein a rotor blade de-icing system is coupled to at least one of the first and second load introduction devices.

11. A wind turbine having at least one rotor blade as claimed in claim 1.

12. A method for installing a rotor blade, comprising:
providing the rotor blade as claimed in claim 1;
passing a lifting device through the lifting openings;
securing the lifting device on the first and second load introduction devices; and
raising the rotor blade into an installation position by the lifting device.

13. A method comprising:
producing the rotor blade as claimed in claim 1, the producing comprising:
forming a subassembly by:
connecting a first front spar web to the first and second load introduction devices; and
connecting a second rear spar web to the first and second load introduction devices;
wherein the front pressure-side spar cap, the front suction-side spar cap and the first front spar web form a front spar;
wherein the rear pressure-side spar cap, the rear suction-side spar cap and the second rear spar web form a rear spar; and
arranging the subassembly on a rotor blade element of the rotor blade.

14. The method as claimed in claim 13, wherein the rotor blade element is an outer shell of the rotor blade.

15. The method as claimed in claim 12, wherein securing the lifting device on the first and second load introduction devices comprises arranging lifting elements in the lifting openings and securing the lifting device on the lifting elements.

16. The rotor blade as claimed in claim 6, wherein the load coupling devices are arranged substantially orthogonally to the longitudinal direction.

17. The rotor blade as claimed in claim 8, wherein the first material is at least one of balsa wood, foam, polyethylene terephthalate, or polyvinyl chloride.

18. The rotor blade as claimed in claim 8, wherein the first material has a lower density than a material of the front or rear pressure-side spar caps and the front or rear suction-side spar caps.

19. The method as claimed in claim 13, wherein the first and second load introduction devices are arranged between at least one of the front or rear pressure-side spar caps and at least one of the front or rear suction-side spar caps.

* * * * *